(12) United States Patent
Hartel et al.

(10) Patent No.: US 9,451,461 B2
(45) Date of Patent: Sep. 20, 2016

(54) SUBSCRIBER IDENTITY MODULE FOR AUTHENTICATING A SUBSCRIBER ON A COMMUNICATION NETWORK

(71) Applicant: GIESECKE & DEVRIENT GMBH, Munich (DE)

(72) Inventors: Karl Eglof Hartel, Munich (DE); Ulrich Huber, Munich (DE); Nils Nitsch, Markt Schwaben (DE)

(73) Assignee: Giesecke & Devrient GmbH, Munich (DE)

( * ) Notice: Subject to any disclaimer, the term of this patent is extended or adjusted under 35 U.S.C. 154(b) by 0 days.

(21) Appl. No.: 14/428,503

(22) PCT Filed: Aug. 22, 2013

(86) PCT No.: PCT/EP2013/002529
§ 371 (c)(1),
(2) Date: Mar. 16, 2015

(87) PCT Pub. No.: WO2014/044348
PCT Pub. Date: Mar. 27, 2014

(65) Prior Publication Data
US 2015/0281957 A1   Oct. 1, 2015

(30) Foreign Application Priority Data
Sep. 19, 2012   (DE) .................. 10 2012 018 540

(51) Int. Cl.
*H04M 3/16* (2006.01)
*H04W 12/06* (2009.01)
(Continued)

(52) U.S. Cl.
CPC ............. *H04W 12/06* (2013.01); *H04M 1/675* (2013.01); *H04W 4/003* (2013.01); *H04W 8/06* (2013.01); *H04W 8/18* (2013.01); *H04W 48/18* (2013.01); *H04W 88/06* (2013.01); *H04W 88/005* (2013.01)

(58) Field of Classification Search
CPC ........................ H04W 4/003; G06K 7/0013
USPC .......................... 455/3.04, 411, 425
See application file for complete search history.

(56) References Cited

U.S. PATENT DOCUMENTS

| 7,706,791 B2 | 4/2010 | Heutschi |
| 2005/0164737 A1 | 7/2005 | Brown |

(Continued)

FOREIGN PATENT DOCUMENTS

| DE | 102004015536 A1 | 10/2005 |
| DE | 102012016166 A1 | 2/2014 |

(Continued)

OTHER PUBLICATIONS

German Search Report for corresponding German Application No. 102012018540.5, Apr. 29, 2013.

(Continued)

*Primary Examiner* — Thomas Lett
(74) *Attorney, Agent, or Firm* — Workman Nydegger (57) ABSTRACT

A subscriber identity module for authenticating a subscriber on a communication network includes: a first set of subscriber identity data for authenticating the subscriber; a second set of subscriber identity data for authenticating the subscriber, with the first set of subscriber identity data differing from the second set of subscriber identity data; and a means for managing the first and second sets of subscriber identity data, with the managing being realized by management functions. The subscriber identity module can be extended to a method for managing the subscriber identity module, to a use of the subscriber identity module in a mobile end device, and to a system comprising subscriber end devices and a remote entity.

15 Claims, 3 Drawing Sheets (51) Int. Cl.
*H04W 48/18* (2009.01)
*H04W 88/06* (2009.01)
*H04M 1/675* (2006.01)
*H04W 4/00* (2009.01)
*H04W 8/06* (2009.01)
*H04W 8/18* (2009.01)
*H04W 88/00* (2009.01)

(56) References Cited

U.S. PATENT DOCUMENTS

| | | |
|---|---|---|
| 2005/0221801 A1 | 10/2005 | Liu et al. |
| 2006/0089124 A1* | 4/2006 | Frank ............... H04L 63/0853 455/411 |
| 2008/0020755 A1* | 1/2008 | Liu ..................... H04W 8/245 455/432.1 |
| 2008/0081609 A1* | 4/2008 | Burgan ................ H04W 8/18 455/425 |
| 2009/0024728 A1 | 1/2009 | Russell |
| 2011/0117909 A1 | 5/2011 | Cao et al. |
| 2011/0246317 A1* | 10/2011 | Coppinger ............ G06Q 20/10 705/17 |
| 2011/0294472 A1* | 12/2011 | Bramwell ............... H04W 8/04 455/413 |
| 2011/0306318 A1* | 12/2011 | Rodgers ................ H04W 8/183 455/410 |
| 2012/0157094 A1 | 6/2012 | Cheng et al. |

FOREIGN PATENT DOCUMENTS

| | | |
|---|---|---|
| EP | 1059822 A2 | 12/2000 |
| FR | 2941585 A1 | 7/2010 |
| GB | 2473753 A | 3/2011 |
| WO | 2011057668 A1 | 5/2011 |
| WO | 2011094652 A1 | 8/2011 |
| WO | 2013041849 A1 | 3/2013 |

OTHER PUBLICATIONS

International Search Report for corresponding International PCT Application No. PCT/EP2013/002529, Nov. 14, 2013.

* cited by examiner

SUBSCRIBER IDENTITY MODULE FOR AUTHENTICATING A SUBSCRIBER ON A COMMUNICATION NETWORK

This invention relates to a subscriber identity module for authenticating a subscriber on a communication network, to a method for managing a subscriber identity module having a first set of subscriber identity data and a second set of subscriber identity data, to a use of the subscriber identity module, and to a system comprising subscriber identity module and a remote server entity.

Subscriber identity data serve for uniquely identifying and/or authenticating a subscriber in a communication network, for example a digital mobile radio network. Through said subscriber identity data it is possible for an operator of a communication network to associate the utilization of a service offered by the network operator, for example a speech and/or data service, uniquely with each subscriber in the communication network. Further, it is possible for the operator to enable network access, i.e. registration on the communication network, as soon as an authentication of the subscriber has taken place, or to refuse network access if an authentication of the subscriber is not possible.

Said subscriber identity data are incorporated into a subscriber identity module (SIM). Each end device is usually equipped with such a subscriber identity module to be able to utilize services of the communication network.

When a subscriber logs on to a communication network, it is ascertained by means of the subscriber identity data whether the subscriber is known in the communication network and which services the subscriber may utilize in the network. A subscriber who is not uniquely identifiable or authenticatable is not authorized to utilize the services and is rejected by the network.

It is known to incorporate into a subscriber identity module at least a first set and a second set of subscriber identity data between which one can switch. Such subscriber identity modules are also designated dual-IMSI, multi-IMSI and/or auto-roamer SIM.

Managing the subscriber identity data as well as switching from the first set of subscriber identity data to the second set of subscriber identity data in the subscriber identity module is usually effected by means of a remote server entity, for example a network entity for managing subscriber identity data, also called a subscription manager. The remote server entity transmits for this purpose corresponding management and switching commands to the respective subscriber identity module. Managing and switching is then carried out by the operating system of the subscriber identity module. Alternatively, managing and switching is carried out by an operating system-related application code of the subscriber identity module.

The problem with this is that the subscriber identity module has no switching strategies, or only statically configured ones, implemented therein as switching code functions, for example in the case of a lack of network coverage, an overloaded network, or specific location criteria. These functions are a firm part of the subscriber identity module and implemented in an unchangeable manner. Thus, the subscriber identity module is not able to react appropriately to current environmental influences, network influences, end-device influences, etc. Thus, the subscriber identity module cannot be managed on the basis of individual settings, current network parameters and/or end-device properties. Instead, the implemented static management and switching functions are always called up and completely processed.

It is impossible for all the kinds of peculiarities or influences that are to be heeded when managing and/or switching the subscriber identity module to be already detected and taken into account within the operating-system functions, due to the multiplicity of possibilities of influence through the network, the end device, the momentary location as well as the multiplicity of management commands. Further, learning effects can additionally arise in the life cycle of the subscriber identity module, which enable improved management, in particular switching. Furthermore, better methods can also be developed after delivery of the subscriber identity module, which are then not utilizable for all the subscriber identity modules located in the field or can only be utilized through a cost-intensive exchange of the modules.

From the applicant's German application, with application number DE 102012016166.2, filed with the German Patent and Trademark Office on 14 Aug. 2012, it is known to adapt the switching behavior in dependence on network parameters in order to ensure a successful network registration, if possible, after switching. Building on the solution described therein, the present invention is based on the object of further flexibilizing the management of the subscriber identity module. Reference is made herein to the disclosure of DE 102012016166.2 to the full extent.

SUMMARY

The object is achieved in particular by a subscriber identity module for authenticating a subscriber on a communication network, with the subscriber identity module having a first set of subscriber identity data for authenticating the subscriber and at least a second set of subscriber identity data for authenticating the subscriber, with the first set of subscriber identity data differing from the second set of subscriber identity data. Further, the subscriber identity module has a means for managing the first and second sets of subscriber identity data, with the managing being realized by static management functions. The method is characterized in that the managing means further has management application code, and said management application code enables a variable managing by adapting the static management functions to the environment parameters of the subscriber identity module.

The method according to the invention is based on dividing the means for managing the subscriber identity data into static management functions and variable management application code, preferably in the form of Java application code. Static management functions are implemented firmly as part of the subscriber identity module. To adapt the management functions to the respective environmental condition, they are triggered and executed variably according to the invention via management application code, preferably Java application code. The management application code thus defines for example the actual switching time point for the switching by means of static switching functions.

Environment parameters are understood according to the invention to be all influences and circumstances in the environment of the subscriber identity module. Examples to be mentioned are network parameters, network status information, updating of files of the subscriber identity module, parameters of the end device in which the subscriber identity module is operational.

Static management functions are understood to be in particular operating-system functions and/or program code implemented in an operating system-related manner. A static switching function is understood to be in particular the adapting of the file system to the second set of subscriber identity data. A static management function is understood to be in particular the replacing of the authentication data (also designated triplet/quintet) of the first set of subscriber identity data, for example the authentication algorithm A3, A5 and/or A8 as well as the authentication key Ki, by the corresponding authentication data of the second set of subscriber identity data. A static switching function is further understood to be in particular the replacing of a subscriber-specific OTA key for OTA communication with the communication network. A static management function is further understood to be in particular the replacing of subscriber-specific applications, for example subscriber identity data-specific JAVA applets. The static management functions are provided for loading, activating, switching, deactivating and/or deleting the subscriber identity data.

The variable managing is realized in particular via first functions of the management application code. Said functions are arranged to individually evaluate parameters of the communication network, status information about the communication network, the end device and/or the subscriber identity module, the end device's information on state as well as information on state with respect to environmental conditions such as location, roaming scenarios, etc., and thus to adapt the managing of each subscriber identity module and of the corresponding subscriber identity data. For example, a first function is the function "check_Network_Status" for checking the basic registration on the first or second network in dependence on the subscriber identification data or for checking a loss of network connection despite previous successful registration on said network. For example, a first function is the function "check_MCC" for checking the location of the subscriber identity module. For example, a first function is the function "set_waitingtime" for setting a waiting time individual to the subscriber identity module. For example, a first function is the function "check_Timeout" for checking the expiry of the waiting time in the case of an unsuccessful attempt to register or a lack of confirmation by the network after a registration has been effected.

The variable managing also comprises in particular the loading of further sets of subscriber identity data to the subscriber identity module. In so doing, the first functions serve to analyze the loading command, in particular which special loading mechanism is implemented in the subscriber identity module and which loading mechanism was selected on the network side. On the basis of the analysis the subscriber identity module is then initialized by means of the first functions, in order for the subscriber identity data to be loadable properly. Confidential data such as authentication information, authentication key, OTA key and the like are incorporated into the subscriber identity module with the aid of the first functions by means of an additional security layer according to the standard GSM 03.48.

The variable managing also comprises in particular the activating of subscriber identity data, i.e. of a set of subscriber identity data. The activating is necessary to be able to use the subscriber identity data in the subscriber identity module for authenticating/identifying the subscriber in the communication network. Upon activation the status of the set of subscriber identity data is changed from "new" to "activated". With the activation the data integrity of the set of subscriber identity data is confirmed, on the one hand. The data integrity is thereby checked with the aid of the first functions, in particular by means of a CRC check sum. Only if the CRC check sum of the stored subscriber identity data to be activated is equal to a CRC check sum transmitted by the network and received by the subscriber identity module, the subscriber identity data are activated. With the activation the hitherto activated set of subscriber identity data is blocked for further updating on the network side, on the other hand.

The variable managing also comprises in particular the deactivating of subscriber identity data, i.e. of a set of subscriber identity data. In so doing, a deactivation command is emitted on the network side and received by the subscriber identity module. Through the deactivating, the subscriber identity data in the subscriber identity module can no longer be used for authenticating/identifying the subscriber in the communication network. Upon deactivation the status of the subscriber identity data, i.e. of the set of subscriber identity data, is changed from "activated" to "deactivated". Before deactivating, the first functions check the status of the subscriber identity data. If the set of subscriber identity data to be deactivated is the only activated set of subscriber identity data on the subscriber identity module, deactivating is prevented in order to ensure that the subscriber identity module is still accessible on the network side.

The variable managing also comprises in particular the variable switching from first subscriber identity data to second subscriber identity data, i.e. from a first set of subscriber identity data to a second set of subscriber identity data. In principle, all sets of subscriber identity data contained in the subscriber identity module are switchable. If for example a first, a second and a third set of subscriber identity data are present in the subscriber identity module, one can switch flexibly between the three subscriber identity data, i.e. the three sets of subscriber identity data. In so doing, only the first, second or third set of subscriber identity data is ever activated at a given time.

The variable managing also comprises in particular the variable deleting of subscriber identity data. In so doing, the memory area is freed and can be used for loading/depositing new subscriber identity data.

A subscriber identity module for the purposes of the invention is a module reduced in overall size and range of resources and having a microcontroller and at least one data interface for communication with an end device. Said subscriber identity module has a secure memory area in which the subscriber identity data are securely incorporated in order to prevent attempted tampering and/or attempted abuse upon identification and/or authentication on the network. The subscriber identity module is operational by means of the end device.

The subscriber identity module is for example a chip card, also UICC or SIM card, in a mobile radio network having the subscriber's machine-readable subscriber identity data stored on a chip. Such subscriber identity modules are operated by means of card reading units in an end device, and are in particular intended to be removable from the end device for the purpose of exchange or use in a second end device.

Alternatively, the subscriber identity module is an integral part within the mobile end device, for example a hard-wired electronic component. Such subscriber identity modules are also designated embedded UICCs (eUICCs). In this structural form said subscriber identity modules are not intended to be removed from the end device and can in principle not be easily exchanged. Such subscriber identity modules can also be configured as embedded Secure Elements, i.e. as secure hardware components, in the mobile end device.

Alternatively, the subscriber identity module is an M2M module. Said modules are used for remote monitoring, remote control and remote servicing of end devices such as machines, plants and systems. They can alternatively also be used for meter units such as electricity meters, hot-water meters.

Alternatively, the subscriber identity module is configured as a software component in a trustworthy part of an operating system, a so-called Trusted Execution Environment (TEE) of the end device. The subscriber identity module is then configured for example within a secure runtime environment in the form of programs running therein, so-called trustlets.

Subscriber identity data for the purposes of the invention are, on the one hand, data that uniquely identify a subscriber in the communication network, for example an International Mobile Subscriber Identity (IMSI) and/or subscriber-specific data. The IMSI is the subscriber identity datum that is unique in a mobile communication network. It is composed of the country code MCC (Mobile Country Code), the network code MNC (Mobile Network Code) and a serial number that is assigned by the network operator. Subscriber identity data additionally comprise status information, whereby the subscriber identity data can have "active", "inactive" and/or "in use" as a status.

Further, subscriber identity data can be data that uniquely authenticate a subscriber on the communication network, for example an authentication algorithm, specific algorithm parameters, a cryptographic authentication key and/or a cryptographic over-the-air (OTA) key.

The number of the sets of subscriber identity data on the subscriber identity module is not restricted. It is imaginable that thirty or more sets of subscriber identity data will be present on a subscriber identity module in the future.

A subscriber for the purposes of the invention is for example a person who wishes to access services of the communication network by means of the end device. A subscriber is also understood to be an end device in an M2M environment.

A communication network for the purposes of the invention is a technical device on which the transfer of signals takes place with identification and/or authentication of the communication partner, thereby offering services. The communication network is preferably constructed in mobile radio cells, with the size of a radio cell depending on meteorological and geographical circumstances as well as the radio antenna used. In particular, a mobile radio network is understood in this invention to be for example the "Global System for Mobile Communications", GSM for short, as a representative of the second generation, or the "General Packet Radio Service", GPRS for short, or "Universal Mobile Telecommunications System", UMTS for short, as a representative of the third generation, or the "Long Term Evolution", LTE for short, as a representative of the fourth generation.

In a preferred embodiment, the management application code is updatable and/or exchangeable via an over-the-air interface of the communication network. Through this embodiment, the managing means is kept up to date and can if necessary also be adapted to the new parameters and conditions on a short-term basis, for example within the context of a roaming scenario. A change of roaming agreements can thereby also be adapted. Changes of the end device, for example within the context of updating the operating system of the end device, can thereby be adapted.

In a preferred embodiment, the static management functions are second functions, with the first functions of the management application code accessing said second functions by means of a programming interface. Thus, the hard-implemented second functions always remain operational and can be applied adaptively through the programming interface. The programming interface then makes available the functionality for managing by means of the second functions, while the first functions evaluate the respective management command, monitor the management success, and devise/apply an adaptive switchback strategy. Management commands are in particular the loading command for loading new subscriber identity data, the activation command for activating subscriber identity data, the switching command for switching from first to second subscriber identity data (i.e. from a first set of subscriber identity data to a second set of subscriber identity data), the deactivation command for deactivating subscriber identity data, and/or the deletion command for deleting subscriber identity data.

In a preferred embodiment, the first functions comprise the monitoring of current location parameters. If in particular there is a change in the country that the user is in, which is displayed by the network through a changed Mobile Country Code (MCC), the managing means might have to be delayed in time due to the redirecting of the network services by means of the visited communication network. In particular the switching and switching-back to original (first) subscriber identity data should be delayed in time.

In a preferred embodiment, the first functions comprise the generating of waiting periods. Thus, the deleting, activating, deactivating and/or switching or switching-back is coordinated in dependence on the availability of network services, thereby preventing a hard implementation with a possibly premature switching or switching-back, and acting in a user-friendly manner.

In a preferred embodiment, the first functions comprise the adaptive switching-back between the first set of subscriber identity data and the second set of subscriber identity data. The static management functions provide a static switching-back, should the registration on the new network by means of the switched subscriber identity data fail. Due to network events it might be desired to carry out the switching-back only after the expiry of a defined waiting time. Thus, a first function would be: the setting of a waiting time in dependence on the network parameters, and new analysis of the network situation after expiry of the waiting time before switching-back is done. The switching-back is then per se part of the second functions, while the analysis, the setting of the waiting time and the new analysis are then part of the first functions.

In an embodiment of the invention, the variable management functions comprise the generating of confirmation messages when queried by the remote server entity.

In an alternative embodiment, the first functions comprise the adaptive switching between the first subscriber identity data and the second subscriber identity data, i.e. the first set of subscriber identity data and the second set of subscriber identity data, with the switching being initiated by the remote server entity by means of a switching command. In so doing, switching is done immediately by means of static management functions. The first functions now check the status of the hard switching, to switch back again if for example the network is not reachable after expiry of a predefined waiting time. If the second network provider removed the second set of subscriber identity data from its databases, it would no longer be possible for the subscriber identity module to register on the switched second network after the hard switching. The first functions of the Java application code additionally have a function for switching back to the last functioning subscriber identity data, thereby making it possible to switch back to the last valid subscriber profile. Thus, the variable management application code deposits the first subscriber identity data for safeguarding purposes and marks them as the last valid subscriber identity data.

The subscriber identity module must then be switched back to the initial state, which is designated herein as switching-back. If this is controlled by the first functions, further network parameters can be checked to safeguard the switching-back.

According to the invention, the object is also achieved by a method for managing a subscriber identity module having a first set of subscriber identity data and a second set of subscriber identity data. The method comprises the steps of: receiving a management command in the subscriber identity module; managing the first set of subscriber identity data and the second set of subscriber identity data by means of the management command. The method is characterized in that before the managing step management application code is started in the subscriber identity module, that after the managing step communication network parameters are evaluated by the management application code, and that the managing step is adapted in dependence on the evaluating.

According to the invention, there is further provided a use of an above-described subscriber identity module in a mobile communication end device in order to achieve the object at hand. In said use, the communication end device is arranged to make the subscriber identity module operational.

An end device for the purposes of the invention is in principle a device or a device component having means for communication with the communication network in order to enable services of the communication network to be utilized. The term includes for example a mobile end device such as a smart phone, a tablet PC, a notebook, a PDA. The end device can for example also be understood to include multimedia end devices such as digital picture frames, audio devices, television sets, e-book readers, which likewise have means for communication with the communication network. The term "end device" also includes for example any type of machine, automaton, vehicle and device having means, in particular mobile radio modems, for communication with the communication network.

According to the invention, there is further provided a system consisting of at least one above-described subscriber identity module and a remote server entity, wherein the remote server entity transmits to the at least one subscriber identity module a management command for managing a first set of subscriber identity data and a second set of subscriber identity data in the subscriber identity module.

Hereinafter the invention, or further embodiments and advantages of the invention, will be explained more closely with the aid of figures, with the figures merely describing exemplary embodiments of the invention. Identical components in the figures are furnished with identical reference signs. The figures are not to be considered true to scale, as individual elements of the figures may be represented with exaggerated size or exaggerated simplicity.

BRIEF DESCRIPTION OF THE DRAWINGS

There are shown.

DETAILED DESCRIPTION OF VARIOUS EMBODIMENTS

Figure 1:
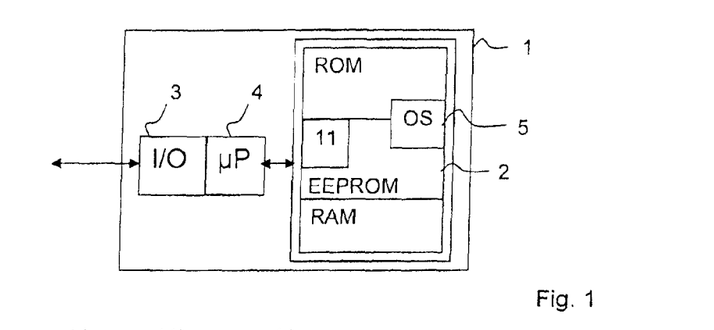
FIG. 1 a block diagram of a subscriber identity module according to the invention
FIG. 2 a detailed representation of the program and data hierarchy in the subscriber identity module according to the invention
FIG. 3 a subscriber profile according to the invention with subscriber identity data FIG. 4 a flowchart of the method according to the invention
FIG. 5 a sketch of an exemplary life cycle of subscriber identity data
Figure 2:
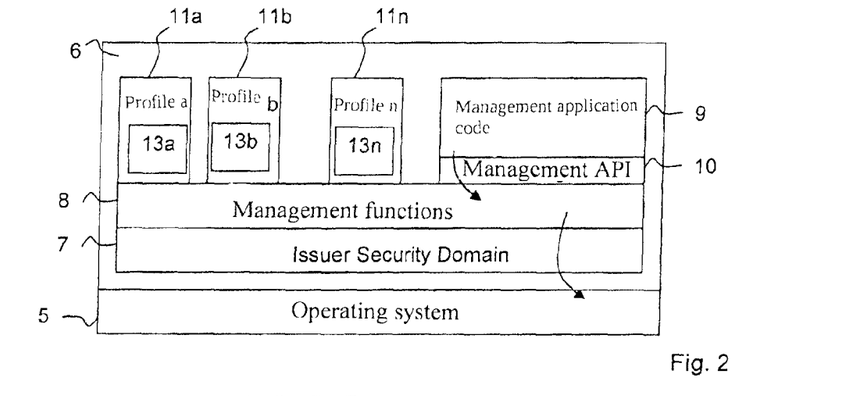

FIG. 1 represents a block diagram of a subscriber identity module 1. The subscriber identity module 1 has a data interface 3. A central computing unit 4 connects the data interface 3 to a memory 2 which can be of volatile (RAM) or non-volatile (ROM, EEPROM, FLASH) configuration. In the memory area 2, in particular in the non-volatile memory area, there are deposited the subscriber profiles 11 containing the subscriber identity data or sets of subscriber identity data 13a, 13b, 13n. Thus, the subscriber identity data 13a, 13b, 13n can be adapted for the respective communication network. In particular, it is possible that the subscriber identity data 13 can be incorporated, for example by OTA or OTI via the data interface 3, after the subscriber identity module 1 has been issued to the subscriber, thereby enabling a more flexible use of the module 1. The memory area 2 further incorporates the operating system 5 by means of which the module 1 can be operated. FIG. 2 represents an exemplary layered representation of the program and data hierarchy in a subscriber identity module 1 according to the invention. The memory area 2 of the subscriber identity module 1 incorporates an operating system 5. The operating system 5 accesses hardware resources of the subscriber identity module 1. The subscriber identity module 1 in turn incorporates a virtual machine, here in the form of a Java Card Virtual Machine, JCVM for short. The JCVM in turn makes available a runtime environment 6, also known as a JCRE. Within the JCRE there is configured a security domain 7 in which the module issuer can incorporate in particular a key individual to the module and applications individual to the module. Said security domain 7 is inaccessible to the operators of the communication networks. Further, the JCRE has management functions 8 implemented therein. Said management functions access programming interfaces typical of subscriber identity modules, such as Open Platform API, SIM API, USIM API and/or Java Card API. Such interfaces make packages of functions available which are utilized by programs of the subscriber identity module 1.

The management functions 8 are second functions according to the above-described type and serve for deactivating an active profile, activating an inactive profile, deleting a deactivated profile, loading a new profile and/or switching between the profiles. Said second functions are a firm part of the subscriber identity module 1 and implemented in an unchangeable manner. The management by means of such static management functions 8 is effected after receipt of a management command S2 (see FIG. 4) from a remote server entity and is not adaptive according to prior art. This is unfavorable in many cases or usage scenarios, however, since different strategies are to be applied during managing depending on the environment.

For example, some cases require hard switching to the second subscriber identity data 13b no matter whether network coverage was recognized in the new network for the second subscriber identity data 13b. The subscriber identity module 1 should then not apply any switchback strategy if possible.

Alternatively, sometimes it is required to switch back (S11) to the first subscriber identity data 13a immediately when no network coverage S7 was recognized in the new network. Here the switching-back should be effected as promptly as possible to enable a user to access a network as quickly as possible.

In yet other alternative cases, attempts should be first be made for a while to obtain a registration on the new network (S7 in connection with S8, S9) before switching-back is to be done (S10, S11).

To enable such adaptive managements, there is made available according to the invention a management application code 9, preferably in the form of Java application code or a Java applet. Said management application code 9 has first functions which, unlike the second functions 8, can be replaced, reloaded and/or updated during the life cycle of the subscriber identity module 1. For this purpose, either an over-the-air (OTA) interface or an Internet-based (OTI) interface is used, with the reloaded and/or updated management application code 9 being incorporated into the memory area 2 via the data interface 3.

The management application code 9 is programmed individually. The management application code 9 has in particular the following first functions:
receiving and evaluating the management command from the remote entity (step S4 in FIG. 4);
monitoring the launched management;
monitoring network parameters MCC, MNC (step S7 of FIG. 4) and generating management information from said parameters;
implementing an adaptive fallback strategy (step S10 of FIG. 4);
making available waiting periods during switching (steps S8, S9 of FIG. 4).

To enable the management application code 9 to influence the second (static) management functions 8, an additional programming interface 10, a management API, is provided. The latter triggers the actual management functions 8, in particular the switching between the first subscriber identity data 13*a* and the second subscriber identity data 13*b*, the loading of subscriber identity data 13, the activating/deactivating of subscriber identity data 13, and the deleting of subscriber identity data 13.

The management application code 9 thus accesses via the programming interface 10 the static management functions 8, which in turn directly access the operating system 5, represented here by the arrows. This setup enables more flexible managing as well as the implementing of alternative management strategies, as to be described in more detail hereinafter with the aid of FIG. 4.

The subscriber identity module 1 represented in FIG. 2 is equipped with a plurality of subscriber profiles 11. Each subscriber identity profile 11 according to FIG. 2 contains subscriber identity data 13*a*, 13*b*, 13*n* (or a set of subscriber identity data) which uniquely identify and/or authenticate a subscriber on respective different and/or identical communication networks. With such subscriber identity modules 1 it is no longer imperative that an operator of a network generates a new subscriber identity module 1 and issues it to the subscriber in the form of a SIM card for identifying and authenticating a subscriber on its network on the basis of a closed contract. Instead, a profile 11 is created by the network operator on the basis of the closed contract. The profile 11 is then loaded to the subscriber identity module 1 already incorporated in the end device, and can exist alongside other profiles 11. As a result, it is no longer necessary to incorporate the subscriber identity module 1 in an end device in a mechanically detachable manner, but instead possible to have hard-wired subscriber identity modules 1, eUICCs for short, incorporated in the end device. This saves room in the end device, thereby enabling other functionalities to be realized in the end device without a need to enlarge the structural form of the end device. The method according to the invention is to be applied in particular to eUICCs, since here a user does not have to change the subscriber identity module 1 to be able to utilize services of a network by means of an alternative contract.

Figure 3:
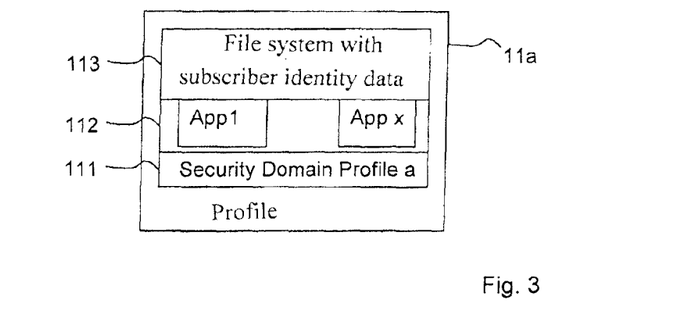

FIG. 3 represents a subscriber profile 11*a* more closely. The profile 11*a* has a security domain 111 for the network operator. The security domain 111 is to be distinguished from the security domain 7. Further, a profile has application code 112 individual to the profile as well as a file system 113 individual to the profile. Each profile 11 can be active or inactive, with only one profile 11 always being active per subscriber identity module 1, which is to say, the subscriber identity data 13 of the active profile 11 are used for authenticating and/or identifying a subscriber on a communication network. Only active profiles 11 can be switched to. In principle, all profiles have equal rights and can be associated with different or identical network operators.

For each profile a separate profile key is provided. Only the activated profiles 11 are linked with the network operator's security. The management application code 9 manages these security domains as well, and updates corresponding keys.

In an embodiment of the subscriber identity module 1, all data and parameters required for a profile are deposited within the profile. The management of the data/parameters is effected by means of the variable functions, i.e. the management application code 9.

Subscriber identity data 13 according to FIG. 2 comprise in particular information about the authentication algorithm used by the operator of the network (Comp 128-1, Comp 128-2, Comp 128-3, Milenage), the International Mobile Subscriber Identity (IMSI), the cryptographic authorization keys used for authentication, the parameter settings of the used algorithm, any network operator-specific OTA keys in order to enable a secure OTA communication, subscriber-specific data, such as name, given name, ID number, date of birth, place of birth, etc.; and/or any additional network operator-specific data, for example which services are released for the subscriber in the respective network, which backup algorithms are available, and the like. This list is by no means exhaustive and can also comprise less, more or different data in alternative examples.

Figure 4:
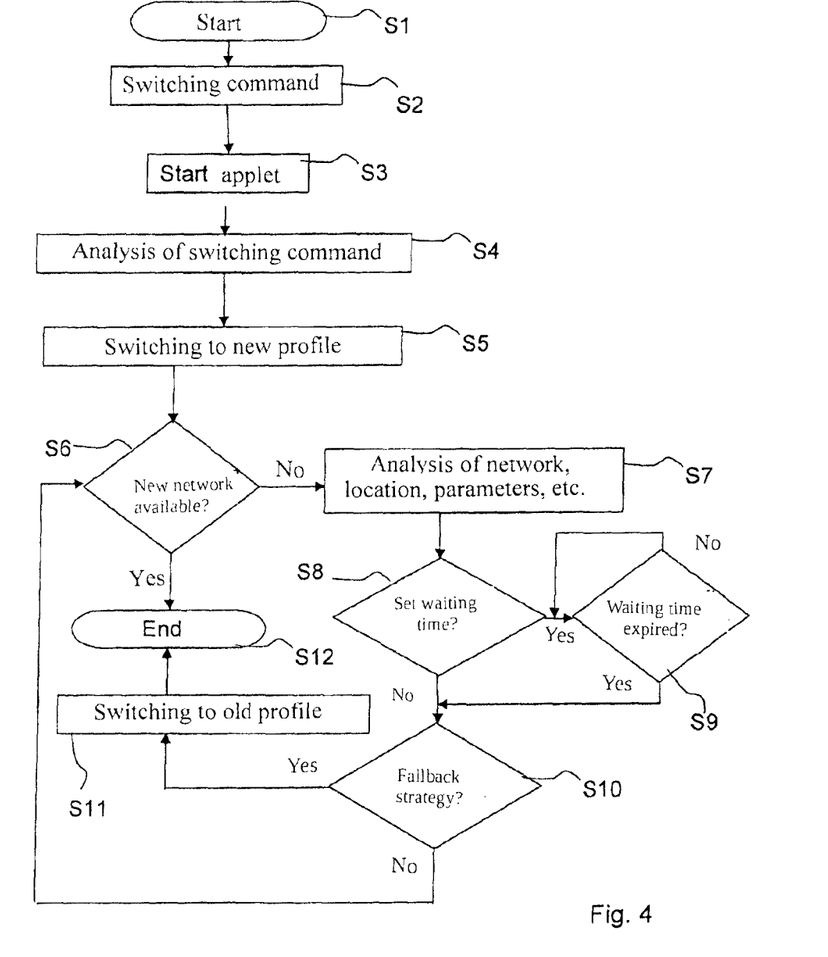

FIG. 4 represents a flowchart of a method according to the invention. It is assumed here that the profile 13*a* is activated and the first set of subscriber identity data 11*a* was used to authenticate the subscriber on the first network. According to step S2 a switching command is received as a management command from a remote entity, a subscription manager, via the first communication network by means of the data interface 3. Said switching command S2 causes the start of the management application code 9 according to step S3.

In the following step S4 there is effected the analysis of the switching command, in particular of the parameters of the switching command. The parameters can be: hard switching without network coverage; switching only when the new network is available; switching only when a certain service is available in the network, or the like. Subsequently, the switching to the second subscriber identity data 13*b* is effected according to step S5. In so doing, the profile 11*a* is deactivated and the second profile 11*b* activated. By means of the second subscriber identity data 13*b* of the activated second profile 11*b* the subscriber identity module 1 attempts a registration on a new communication network. For the step S5 the switching API 10 is used in order to establish access to the static management functions 8.

According to step S6 the management application code 9 monitors whether the new network is available. If the new network is available (case: yes) the method is ended, unless the parameters according to the analysis from step S4 cause an alternative action, whose case is not dealt with in the drawing here. If the new network is not available (case: no in the step S6) an analysis of the network parameters is effected according to step S7. In particular, there is effected the monitoring of the MNC and MCC parameters, a check of the file EF_Loci, possibly the check of the file EF_F-PLMN, and so forth. Additionally, parameters are also checked with regard to the end device, in particular whether or not the end device was ready for switching.

In dependence on the analysis from the steps S4 and S7 it is now decided in the step S8 whether a waiting time should be set. Said waiting time, for example during a roaming scenario, makes available the required time span until the new network enables an authentication by means of the second subscriber identity data 13b. If a waiting time is required in the step S8 (case: yes), it is checked for expiry according to step S9. Thereafter the method is continued with step S10. If no waiting time is required in the step S8 (case: no), the method is likewise continued with step S10, namely a query whether a fallback strategy is necessary in dependence on the steps S4 and S7. If a fallback strategy is required (case: yes in the step S10), a switching-back to the first profile 13a is effected according to the management API 10 and the management functions 8. If no fallback strategy is required (case: no in the step S10), the method jumps back to step S6 and the network availability as well as an analysis of the parameters according to step 7 are carried out again.

Should a management strategy turn out to be very promising in the life cycle of the subscriber identity module 1, for example the setting of a certain waiting time due to the circumstances of the end device with which the subscriber identity module has a communication connection by means of data interface 3, said strategy can be applied as a standard strategy.

Alternatively, it is also possible to supplement or update the management application code 9, in order to adapt the subscriber identity module 1 to changed network conditions and hence to design the switching even more flexibly.

Alternatively, it is also possible to exchange the management application code 9 completely, in order to be able to adapt the subscriber identity module 1 to changed network conditions and hence to design the management even more flexibly.

A substantial part of the variable functions, i.e. of the management application code 9, is the generating of confirmation messages to the remote server entity. A confirmation message is generated for example when the subscriber identity module was able to log on to the network successfully by means of switched subscriber identity data 13. A confirmation message is generated for example when the subscriber identity module was not able to log on to the network successfully by means of switched subscriber identity data 13. A confirmation message is generated for example when the network has sent a query to the subscriber identity module. Such queries are in particular network status queries, location information and/or status information with regard to the subscriber profiles 11, with the confirmations being generated by means of the variable functions, i.e. the management application code 9.

The management strategy can also provide that confirmation messages are transmitted to the network entity by management commands, initiated by the network, only after expiry of a waiting time, in order to be able to delay any following management commands of the network.

In a variant not represented in the drawing, the management application code 9 autonomously creates a security profile 11 before receiving the switching command S2, with the security profile 11 being identical to the activated subscriber profile 11. If a switching command S2 is received in the subscriber identity module 1 from the remote entity and an immediate switching S5 to the second subscriber identity data 13b is requested, it is ensured that a switching-back S11 to the first subscriber identity data 13a deposited in the security profile 11 is possible any time.

Figure 5:
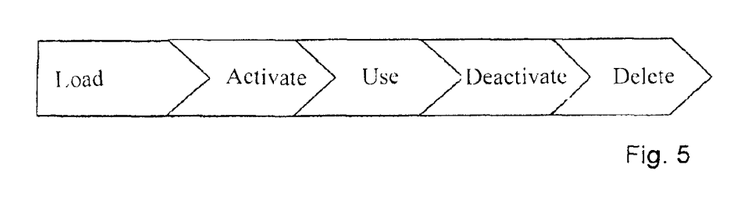

FIG. 5 represents the life cycle of subscriber identity data 13, i.e. of a set of subscriber identity data 13, in a subscriber identity module 1. The total life cycle is managed here by means of the management application code 9 and the static management functions 8, with the management application code 9, i.e. the second functions, controlling the management variably according to the invention. In so doing, the subscriber identity data 13 are deposited in the memory area 2 of the subscriber identity module 1 on the basis of a loading command. The loading command can vary in dependence on the loading mechanism, so that the variable management application code 9 manages the subscriber identity module 1 adaptively. The subscriber identity data 13 are activated by means of an activation command. In so doing, a CRC check sum of the loaded subscriber identity data 13 is compared with a CRC check sum made available by the network before the activation. If the check sums match, the subscriber identity data 13 are activated. From this time point they can be used in the subscriber identity module 1, it being possible for example to switch to said subscriber identity data 13 by means of a switching command S2. The variable management application code 9, in so doing, checks whether the subscriber identity data 13 are actually activated for a switching and prevents a switching to inactive subscriber identity data. If the subscriber identity data 13 are no longer to be usable for an authentication/identification of the subscriber on a network, they can be deactivated by means of a deactivation command. Finally, the subscriber identity data 13 can be deleted by means of a deletion command, thereby enabling the memory area 2 of the subscriber identity module to be utilized for new subscriber identity data 13.

The entire subscriber identity module 1 can be deactivated when the last subscriber identity data (i.e. the last set of subscriber identity data) 13 are deactivated and/or deleted. Such deactivating of the module 1 can be prevented with the aid of the variable management application code 9.

LIST OF REFERENCE SIGNS

1 Subscriber identity module
2 Memory area
3 Data interface
4 Computing unit
5 Operating system
6 Virtual runtime environment, JCRE
7 Security domain for module issuer
8 Firm management functions
9 Variable Java management application code
10 Management programming interface
11a, b, n Subscriber profiles, subscriber slots
   111 Security domain of profile
   112 Application code individual to profile 113 File system individual to profile, subscriber identity data
13a, b, n Sets of subscriber identity data
S1-S12 Method steps

The invention claimed is:

1. A subscriber identity module comprising one or more hardware components for authenticating a subscriber on a communication network, with the subscriber identity module comprising:
   a first set of subscriber identity data for authenticating the subscriber;
   at least a second set of subscriber identity data for authenticating the subscriber, with the first set of subscriber identity data differing from the second set of subscriber identity data; and
   a means for managing the first set of subscriber identity data and the second set of subscriber identity data, with the managing being realized by static management functions;
   wherein:
      the managing means further has management application code, and said management application code enables a variable managing by evaluating, based on one or more environment parameters, whether a static management function that has already been triggered is to be executed and, upon determining that the management function is to be executed based on the evaluation, variably executing the static management function such that the static management function is adapted according to the environment parameters of the subscriber identity module.

2. The subscriber identity module according to claim 1, wherein the management application code comprises first functions which make possible a variable switching between the first set of subscriber identity data and the second set of subscriber identity data.

3. The subscriber identity module according to claim 1, wherein the management application code is updatable and/or exchangeable via an over-the-air interface of the communication network.

4. The subscriber identity module according to claim 1, wherein the static management functions are second functions, and wherein the first functions of the management application code access said second functions by means of a programming interface.

5. The subscriber identity module according to claim 1, wherein the first functions comprise the monitoring of current location parameters.

6. The subscriber identity module according to claim 1, wherein the first functions comprise the generating of waiting periods.

7. The subscriber identity module according to claim 1, wherein the first functions comprise the adaptive switching-back to the first subscriber identity data.

8. The subscriber identity module according to claim 1, wherein the static management functions are switching functions for switching from the first subscriber identity data to the second subscriber identity data.

9. The subscriber identity module according to claim 1, wherein the management application code is configured as Java application code.

10. A use of a subscriber identity module according to claim 1 in a mobile communication end device.

11. A method for managing a subscriber identity module having a first set of subscriber identity data and a second set of subscriber identity data, having the method steps of:
   receiving a management command in the subscriber identity module;
   managing the first set of subscriber identity data and the second set of subscriber identity data by means of the management command;
   wherein:
      before the managing step, management application code is started in the subscriber identity module;
      after the managing step, communication network parameters are evaluated by the management application code to determine whether a static management function that has already been triggered is to be executed; and
      in dependence on the evaluating and upon determining that the management function is to be executed, the managing step is variably executed and is adapted based on the network parameters.

12. The method according to claim 11, wherein the management application code accesses static management functions of the subscriber identity module by means of a management programming interface for the managing step.

13. The method according to claim 11, wherein the evaluating comprises the analysis of the location.

14. The method according to claim 11, wherein the managing comprises the switching, loading, activating, deactivating and deleting of subscriber identity data.

15. A system consisting of at least one subscriber identity module with one or more hardware components according to claim 1 and a remote entity, wherein the remote entity transmits to the at least one subscriber identity module a switching command for switching from a first set of subscriber identity data to a second set of subscriber identity data.

* * * * *